United States Patent [19]

Sakai et al.

[11] Patent Number: 5,582,747

[45] Date of Patent: Dec. 10, 1996

[54] SPOT WELDING CONTROL METHOD AND APPARATUS USING A SERVO WELDING GUN

[75] Inventors: Hirohisa Sakai, Aichi-ken; Masao Kawase, Toyota; Mikiji Suzuki, Okazaki, all of Japan

[73] Assignee: Toyota Jidosha Kabushiki Kaisha, Toyota, Japan

[21] Appl. No.: 293,455

[22] Filed: Aug. 22, 1994

[30] Foreign Application Priority Data

Aug. 25, 1993 [JP] Japan ................................. 5-210753
Sep. 14, 1993 [JP] Japan ................................. 5-228482
Sep. 29, 1993 [JP] Japan ................................. 5-242662
Oct. 22, 1993 [JP] Japan ................................. 5-265056
Oct. 27, 1993 [JP] Japan ................................. 5-268880

[51] Int. Cl.⁶ .................................................. B23K 11/25
[52] U.S. Cl. ........................ 219/86.41; 219/109; 901/42
[58] Field of Search ............................. 219/86.41, 109, 219/110, 124.34; 901/42

[56] References Cited

U.S. PATENT DOCUMENTS

| 4,795,882 | 1/1989 | Hardwick et al. | 219/124.34 |
| 4,841,113 | 6/1989 | Hamada et al. | 219/86.41 |
| 4,984,171 | 1/1991 | Tsujii | 219/86.41 |
| 5,340,960 | 8/1994 | Takasaki et al. | 901/42 |

FOREIGN PATENT DOCUMENTS

| 0566741 | 10/1993 | European Pat. Off. |
| 3522581 | 1/1987 | Germany . |
| 57-56178 | 4/1982 | Japan . |
| 57-37430 | 8/1982 | Japan . |
| 61-186177 | 8/1986 | Japan . |
| 1215476 | 8/1989 | Japan . |
| 1299784 | 12/1989 | Japan . |
| 232385 | 2/1990 | Japan . |
| 5261560 | 10/1993 | Japan . |

OTHER PUBLICATIONS

Patent Abstracts of Japan vol. 18, No. 23 and JP-A-05 261 560.

Patent Abstracts of Japan vol. 11, No. 15 and JP-A-61 190 604.

Primary Examiner—Clifford C. Shaw
Attorney, Agent, or Firm—Cushman, Darby & Cushman, L.L.P.

[57] ABSTRACT

A spot welding method and apparatus having electrode tips one of which is driven by a servo motor. In the method and apparatus, it is determined whether or not an abnormal condition occurs. The abnormal condition includes (a) squeezing some obstacle between the electrode tip and a workpiece, (b) a temperature adhesion of the electrode tips with the workpiece, (c) uneven pressurizing of the workpiece by the electrode tips, (d) a weld nugget dispersion, and (e) a too large electric resistance between the electrode tips and the workpiece. When such abnormal condition is detected, some counter measure is taken to prevent or decrease the abnormal condition.

22 Claims, 14 Drawing Sheets

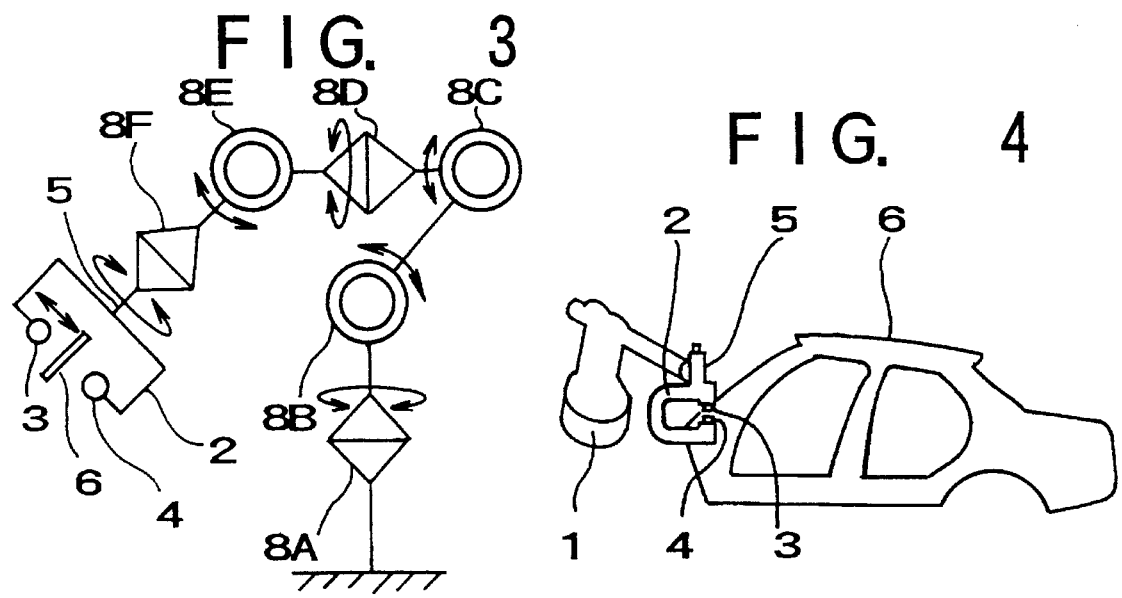
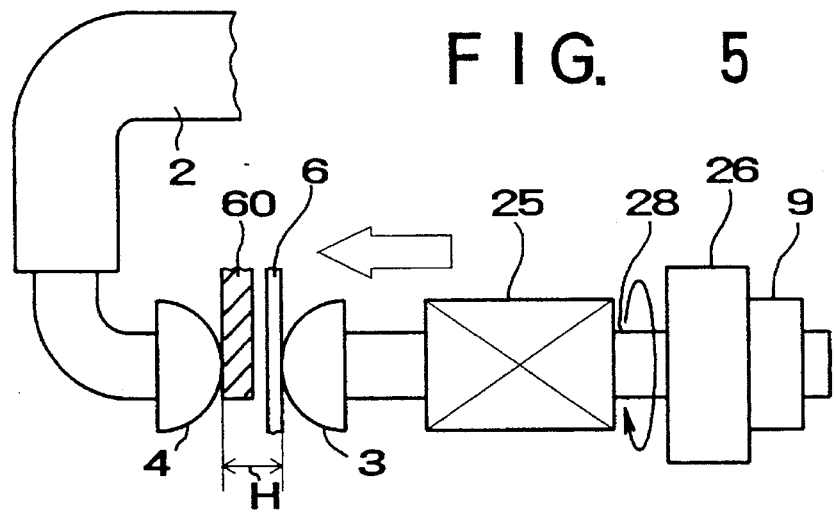
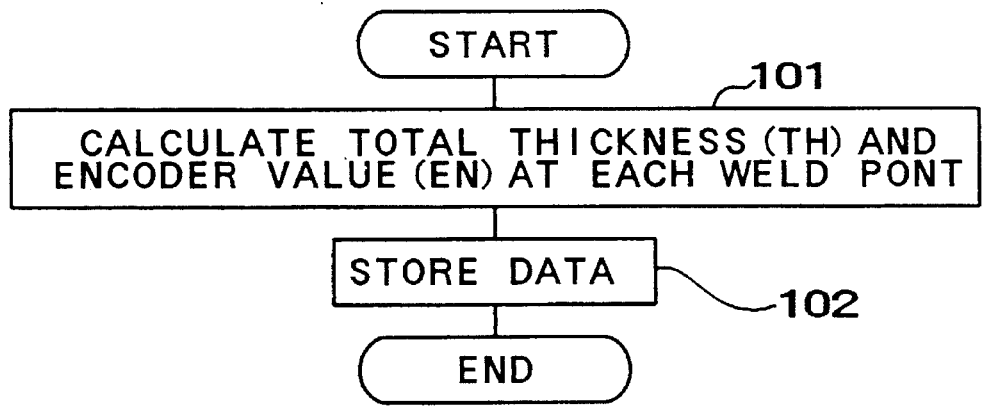

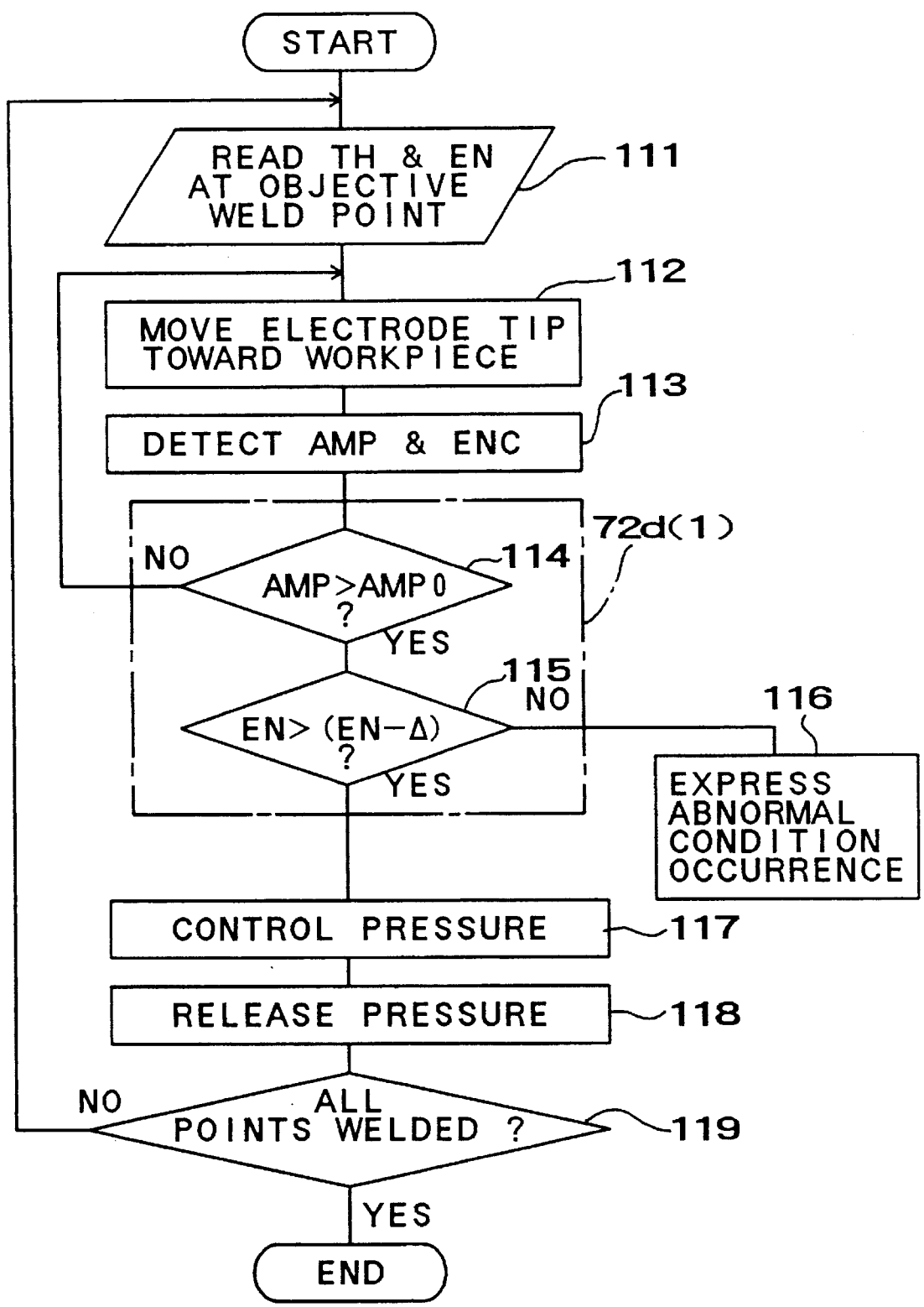

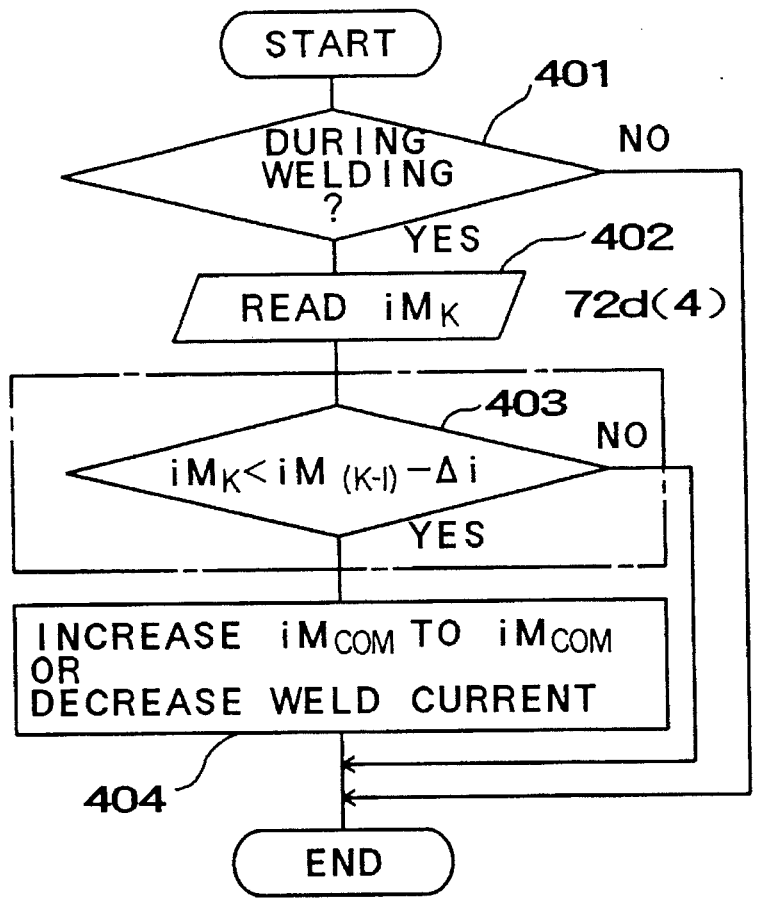
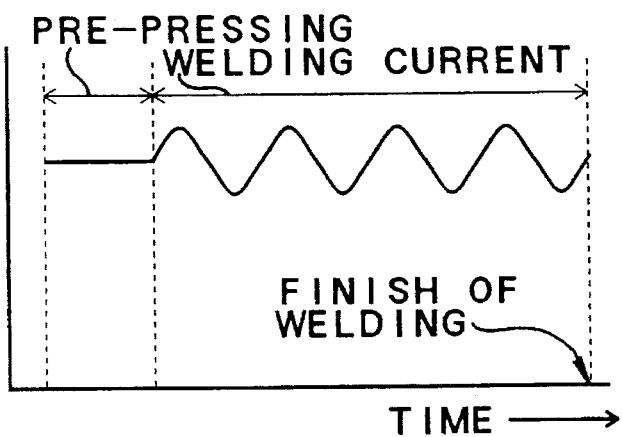
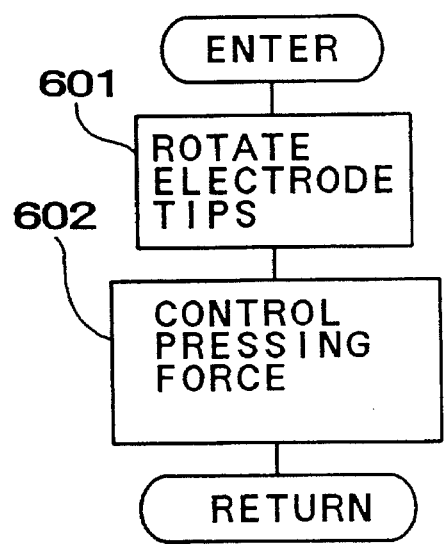

SPOT WELDING CONTROL METHOD AND APPARATUS USING A SERVO WELDING GUN

BACKGROUND OF THE INVENTION

1. Field of the Invention

The present invention relates to a spot welding control method and apparatus using a servo welding gun.

2. Description of Related Art

Automobile body panels are spot-welded using a welding apparatus constructed of a general purpose robot having six degrees of freedom and a spot welding gun coupled to a wrist portion of the robot. The conventional spot welding gun has a pair of electrode tips for pressing a workpiece therebetween, and one of the pair of electrode tips is reciprocally moved by an air cylinder.

Meanwhile, a servo welding gun having a pair of electrode tips, one of which is driven by a servo motor, was proposed by the present applicant in Japanese Patent Application No. 4-94916 filed on Mar. 23, 1992. In the proposed servo welding gun, contact of the welding tip with a workpiece was controlled based on only the servo motor electric current.

However, the proposed spot welding control using the servo welding gun does not fully utilize the capabilities of the servo welding gun, and has the following problems which need to be solved.

First, if some obstacle happens to come between the pair of electrode tips so that the moving electrode tip contacts the obstacle, the servo motor electric current suddenly increases and an erroneous assumption will be made that the electrode tip is in contact with the workpiece.

Second, temperature adhesion of the electrode tip with the workpiece is visually judged by sight by a worker. The servo motor electric current is not used in an automatic detection of such temperature adhesion.

Third, because only one of the pair of electrode tips is moved, changing the contact position where the electrode tip contacts the workpiece will cause a change in the pressing force of the electrode tip. In some cases, the workpiece may be damaged by excessive force from the electrode tip.

Fourth, no measure to counter fused metal dispersion at the welding nugget is taken. More particularly, any signal of the servo motor is used in detecting or predicting generation of fused metal dispersion.

Fifth, electric resistance between the electrode tip and the workpiece is not decreased in the servo welding gun system, though a large electric resistance between the electrode tip and the workpiece tends to generate fused metal dispersion at the nugget.

SUMMARY OF THE INVENTION

An object of the invention is to provide a spot welding control method and apparatus which can improve quality of a spot welding by fully utilizing the capabilities of the servo welding gun. The present invention includes a plurality of embodiments, each of which can solve at least one of the above-described problems.

BRIEF DESCRIPTION OF THE DRAWINGS

The above and other objects, features, and advantages of the present invention will become more apparent and will be more readily appreciated from the following detailed description of the preferred embodiments of the present invention taken in conjunction with the accompanying drawings, in which:

FIG. 3 is a schematic skeleton view of a general purpose robot having six degrees of freedom, a wrist portion of which a welding gun is coupled to;

FIG. 4 is an oblique view of an automobile body to which a spot welding according to the present invention is applied;

FIG. 5 is a partial elevational view of a servo welding gun in accordance with a first embodiment of the present invention;

FIG. 6 is a flow chart of a data storing portion of a control routine in accordance with a first embodiment of the present invention;

FIG. 7 is a flow chart of a pressing control portion of the control routine in accordance with the first embodiment of the present invention;

FIG. 20 is a flow chart of a control routine of the fourth embodiment of the present invention;

FIG. 22 is a time chart illustrating a relationship between a pre-pressing time period and a welding current flowing time period in accordance with the fifth embodiment of the present invention;

FIG. 23 is a flow chart of a control routine of the sixth embodiment of the present invention.

DETAILED DESCRIPTION OF THE PREFERRED EMBODIMENTS

Figure 12:
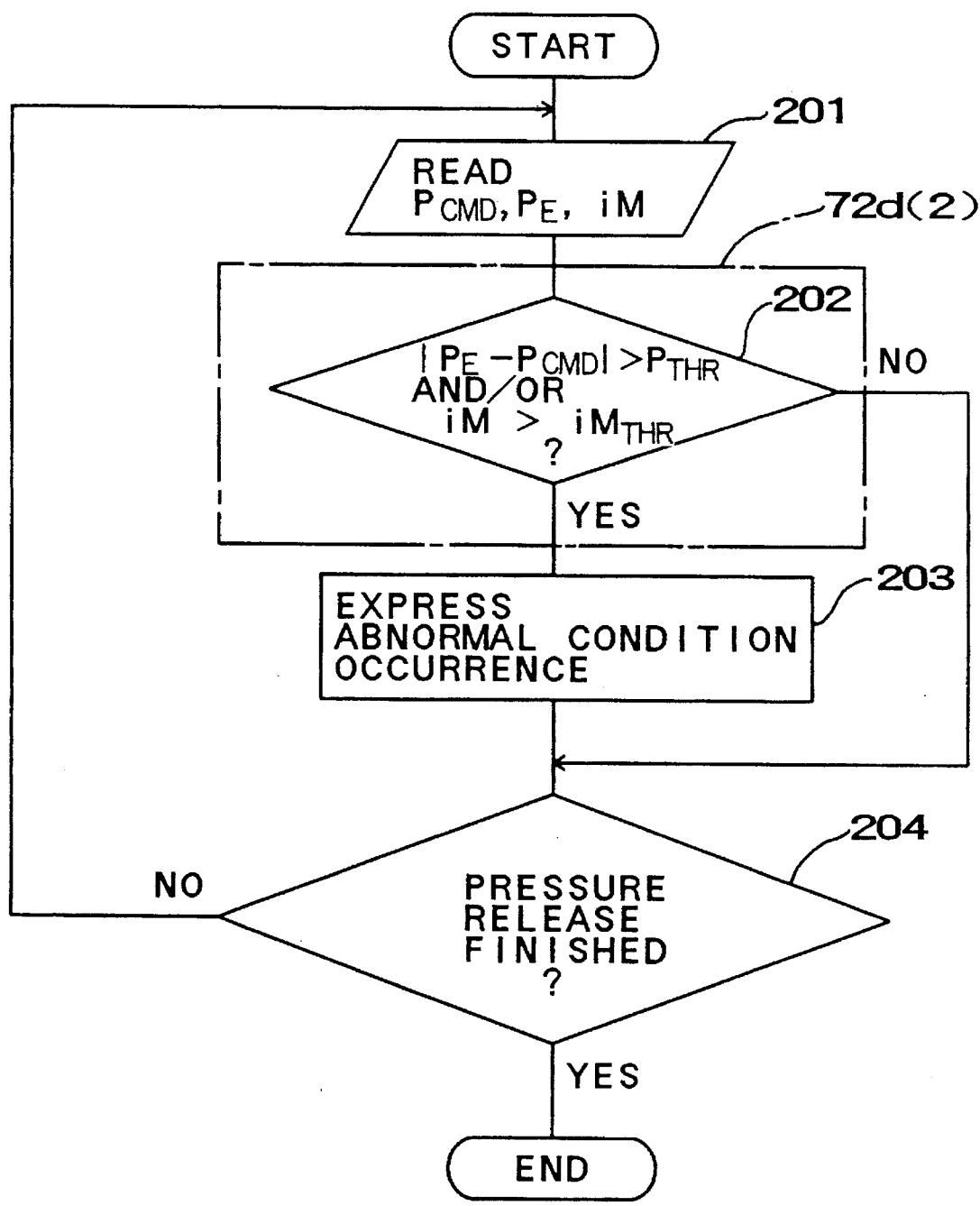
FIG. 12 is a flow chart of a control routine for preventing temperature adhesion of an electrode tip to a workpiece in accordance with the second embodiment of the present invention.
Figure 13:
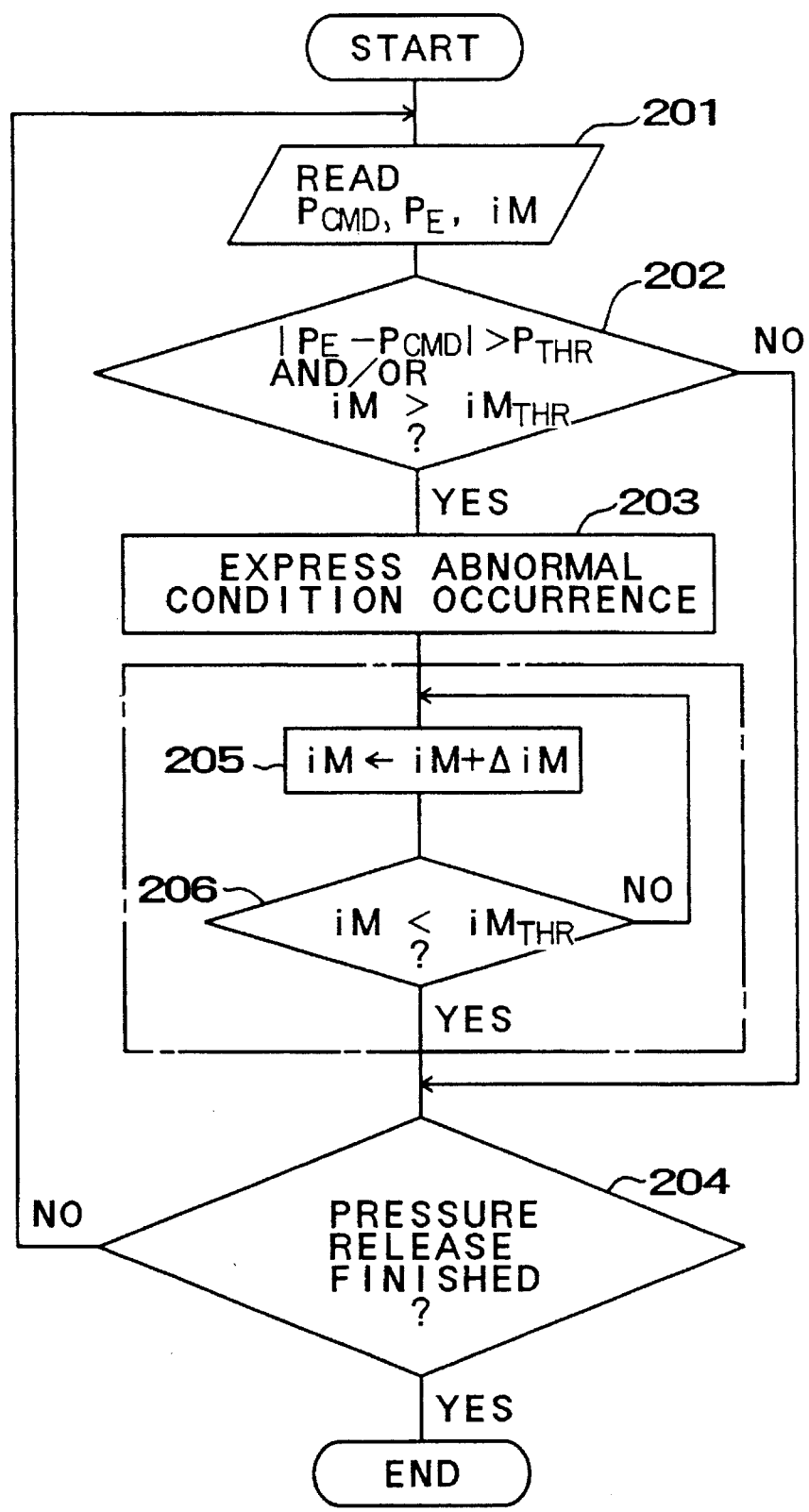
FIG. 13 is a flow chart of FIG. 12 further including steps for breaking the adhering electrode tip away from the workpiece.
Figure 16:
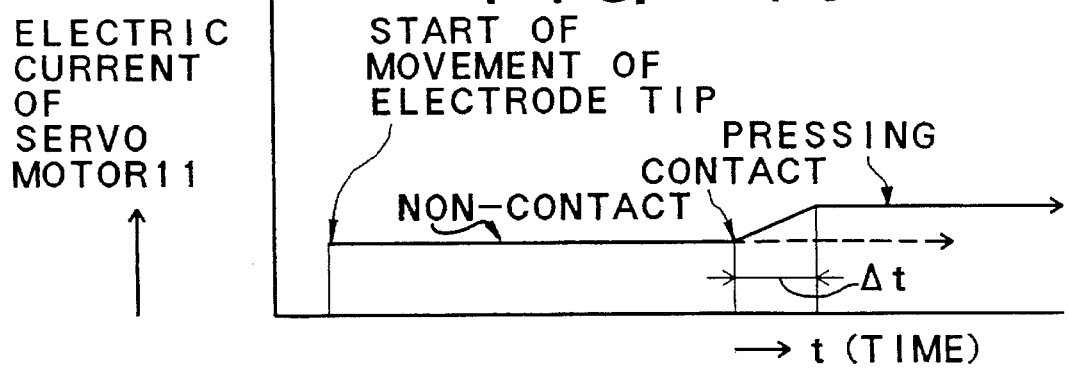
FIG. 16 is a graphical representation illustrating a change in a servo motor electric current with respect to time elapsed, in accordance with the third embodiment of the present invention.
Figure 17:
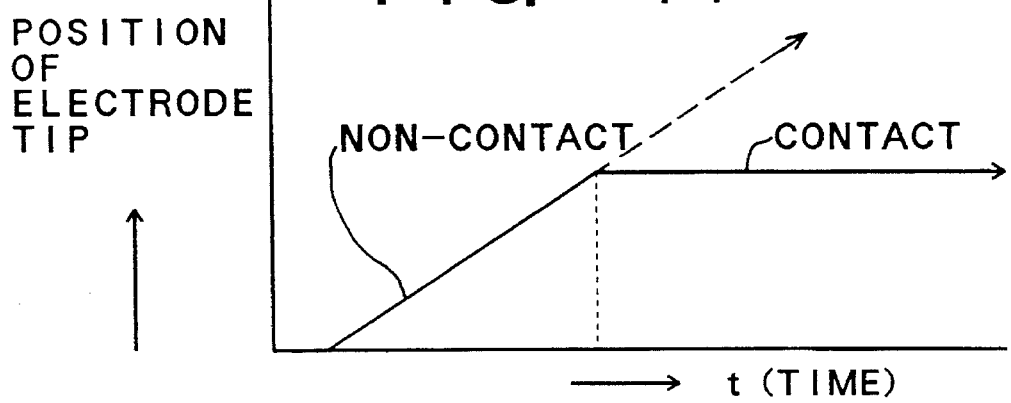
FIG. 17 is a graphical representation illustrating a change in an electrode tip position with respect to time elapsed, in accordance with the third embodiment of the present invention.
Figure 18:
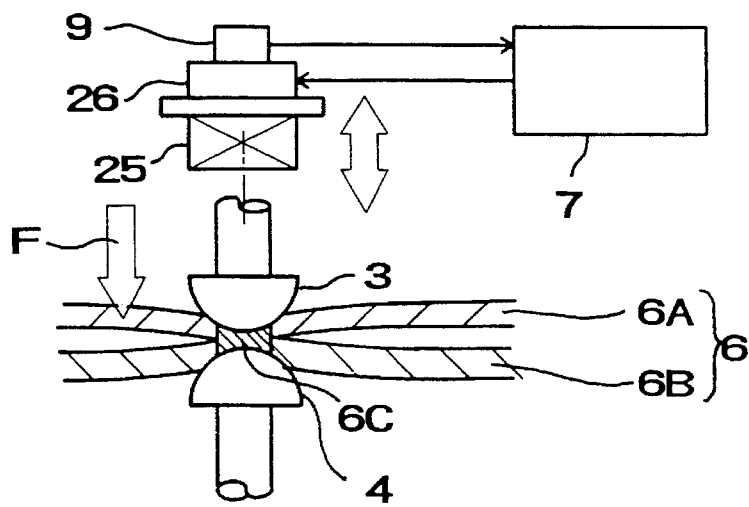
FIG. 18 is a cross-sectional view of the problem of a weld nugget causing a dispersion, which is to be solved in a fourth embodiment of the present invention.
Figure 19:
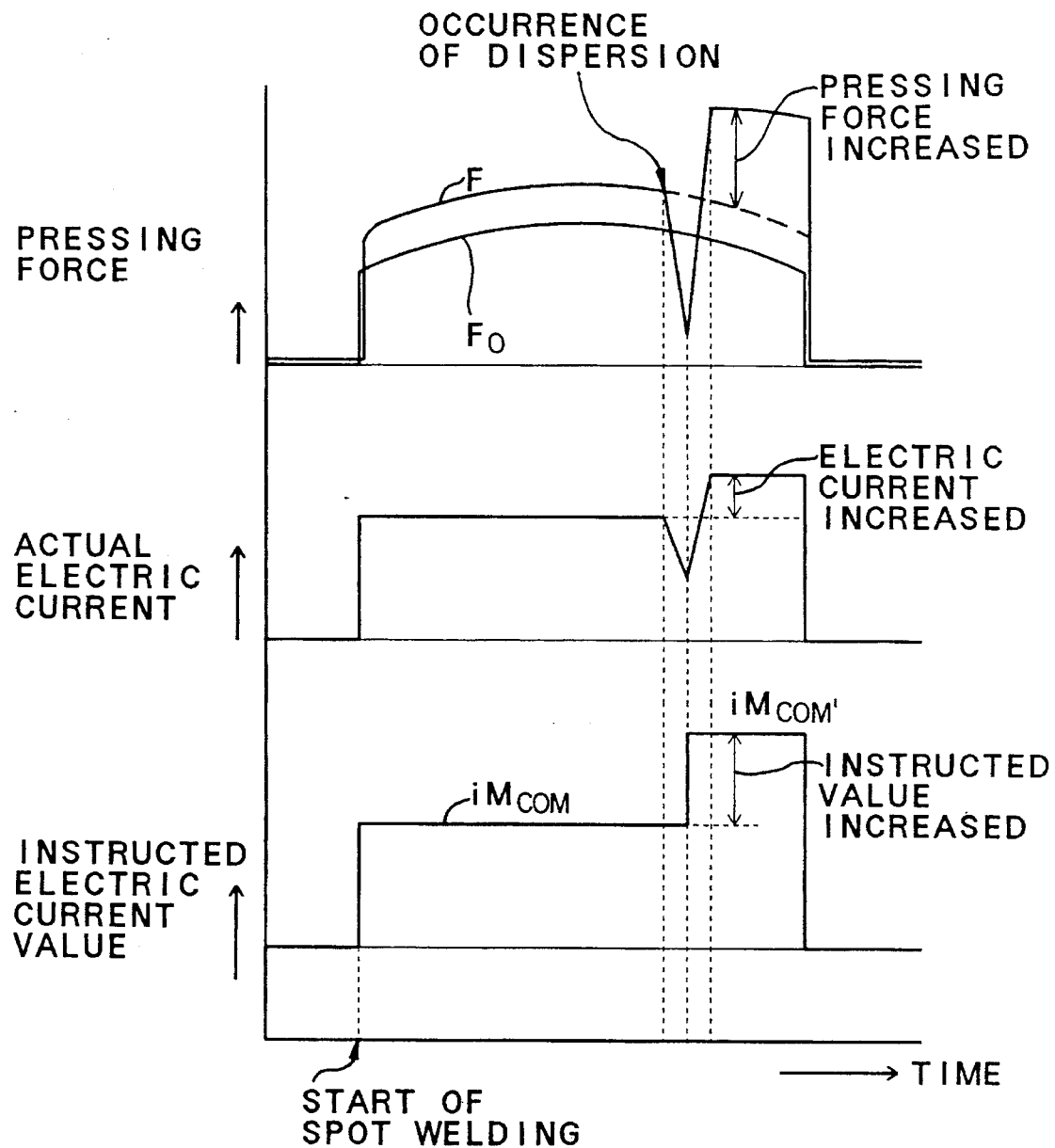
FIG. 19 is graphical representation illustrating changes in a pressing force of an electrode tip, an actual servo motor electric current, and an instruction electric current for the servo motor with respect to time elapsed, in accordance with the fourth embodiment of the present invention.
Figure 21:
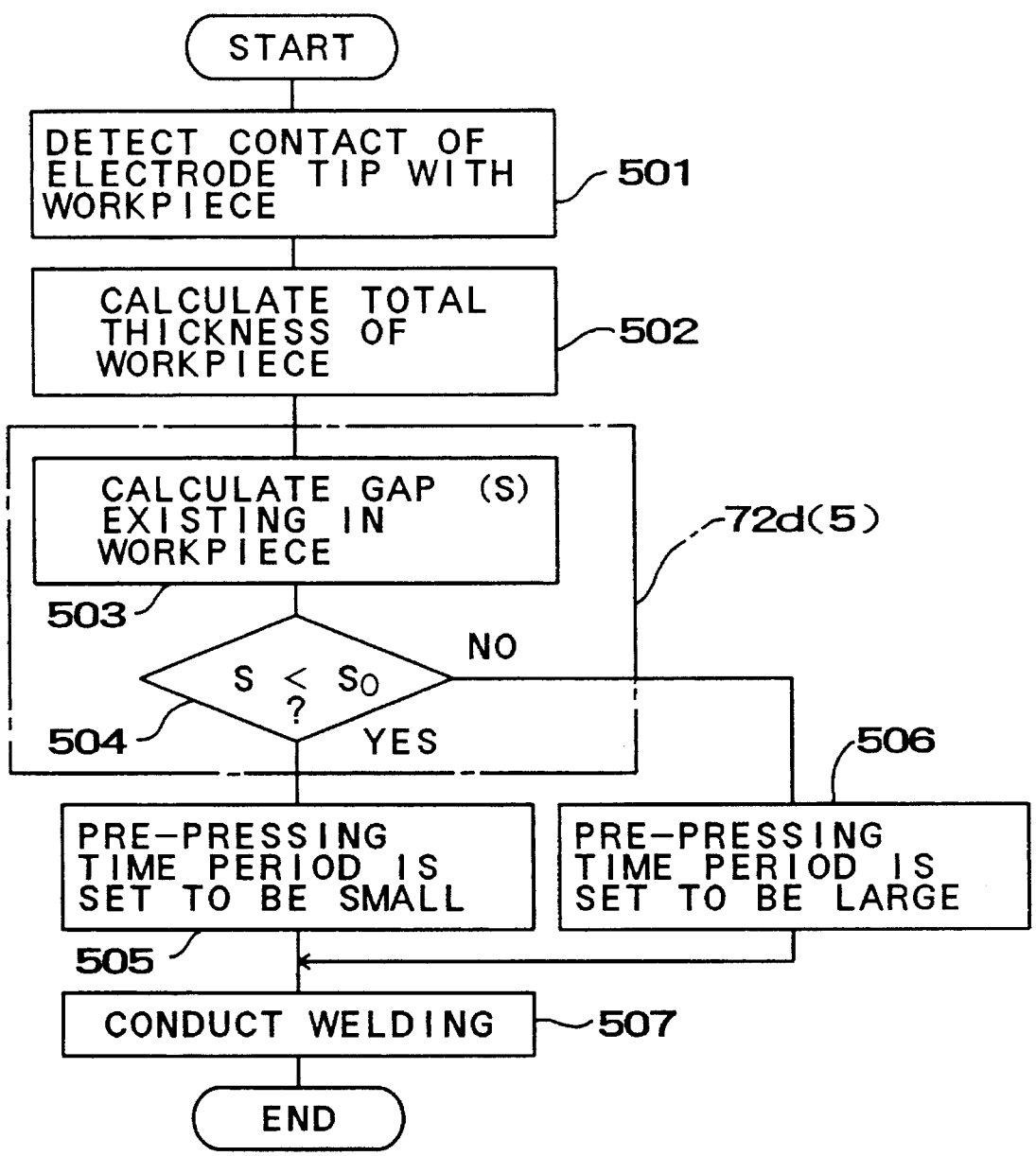
FIG. 21 is a flow chart of a control routine of the fifth embodiment of the present invention.
Figure 24:
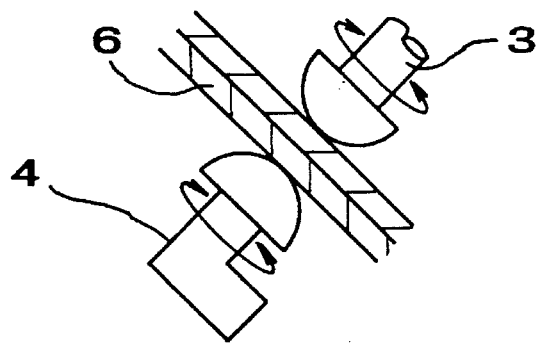
FIG. 24 is an elevational view of a pair of electrode tips rotating about a common axis thereof, in accordance with the sixth embodiment of the invention.

The present invention includes a plurality of embodiments. FIGS. 1 to 4 are applicable to any of the embodiments of the present invention. A first embodiment of the present invention is a method and apparatus for preventing erroneous pressing action when some obstacle happens to come between a pair of electrode tips, and is illustrated in FIGS. 5 to 7. A second embodiment of the present invention is a method and apparatus for automatically detecting temperature adhesion between an electrode tip and a workpiece, and is illustrated in FIGS. 12 and 13. A third embodiment of the present invention is a method and apparatus for evenly pressing a workpiece with a pair of electrode tips with using a double actuator welding gun, and is illustrated in FIGS. 14 to 17. A fourth embodiment of the present invention is a method for preventing weld nugget dispersion and is illustrated in FIGS. 18 to 20. A fifth embodiment of the present invention is a method for preventing weld nugget dispersion due to a gap between panels of a workpiece and is illustrated in FIGS. 21 and 22. A sixth embodiment of the present invention is a method for preventing weld nugget dispersion due to a gap between a workpiece and an electrode tip and is illustrated in FIGS. 23 and 24.

Throughout all of the embodiments of the present invention, portions having common or similar structures are denoted with the same reference numerals.

First, structures and operation thereof common to all of the embodiments of the present invention will be explained with reference to FIGS. 1 to 4.

As illustrated in FIG. 4, spot weld is conducted at welding points of a workpiece 6, for example, an automobile body, using a welding robot 1. A welding gun 2 is coupled to a wrist portion 5 of the welding robot 1. The welding gun 2 has a pair of electrode tips 3 and 4. The pair of electrode tips 3 and 4 hold the welding point of the workpiece 6 and press the workpiece 6 therebetween to spot-weld by flowing welding electric current between the electrode tips 3 and 4.

Figure 1:
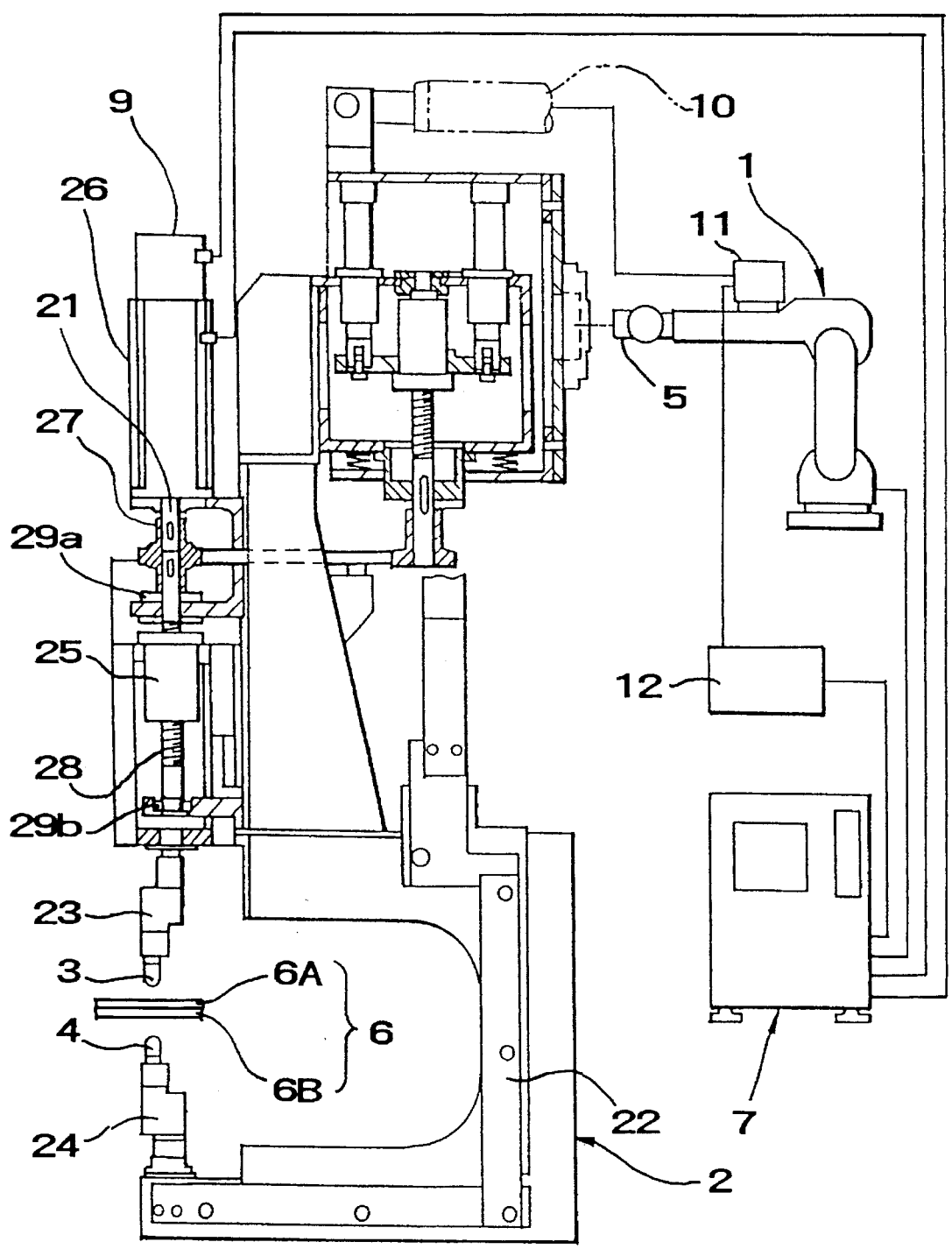
FIG. 1 is an enlarged cross-sectional view of a servo welding gun accompanied by a schematic system diagram of a welding robot, applicable to any embodiment of the present invention.

As illustrated in FIG. 3, the welding robot 1 is a general purpose robot having six degrees of freedom, for example having six articulations. By controlling the rotational angles of the six articulations, the wrist portion 5 and the welding gun 2 can be moved to any position (x, y, z) desired and can have any attitude ($\theta_x$, $\theta_y$, $\theta_z$) desired. The welding gun is controlled by a control unit 7 (FIG. 1). The welding points are programmed in the control unit 7, and the control unit 7 moves the welding gun 2 to the programmed points to perform spot-welding.

As illustrated in FIG. 1, the welding gun 2 has a generally C-shaped framework 22. A tip holder 24 is coupled to one leg portion of the C-shaped framework 22 and holds an electrode tip 4. A servo motor 26 is connected to the other leg portion. A threaded rod 28 of a ball screw coupling is coupled to a rotational shaft 21 of the servo motor 26 via a coupling 27. The threaded rod 28 is rotatably supported by bearings 29a and 29b which are connected to the C-shaped framework 29. A nut 25 is rotatably coupled to the threaded rod 28 via ball elements of the ball screw coupling, so that the nut 25 is moved in an axial direction of the threaded rod 28 by rotating the threaded rod 28. Another tip holder 23 is coupled to the nut 25 via a connecting member. The tip holder 23 holds another electrode tip 3. Thus, the electrode tip 3 is moved by operating the servo motor 26.

An encoder 9 is coupled to the servo motor 26 and detects the rotational angle of the servo motor 26 to thereby detect a position of the electrode tip 3 in terms of an axial direction of the threaded rod 28. An output of the encoder 9 is fed to the control unit 7. The axial position of the electrode tip 3 may be detected by other device than the encoder, for example, by a linear motor.

The electrode tips 3 and 4 are electrically connected to a welding transformer 11 via a cable 10. The welding transformer 11 is electrically connected to a welding power source (not shown) via a controller 12 having a timer function. The controller 12 is electrically connected to the control unit 7 so that a welding time period is controlled by the control unit 7.

Figure 2:
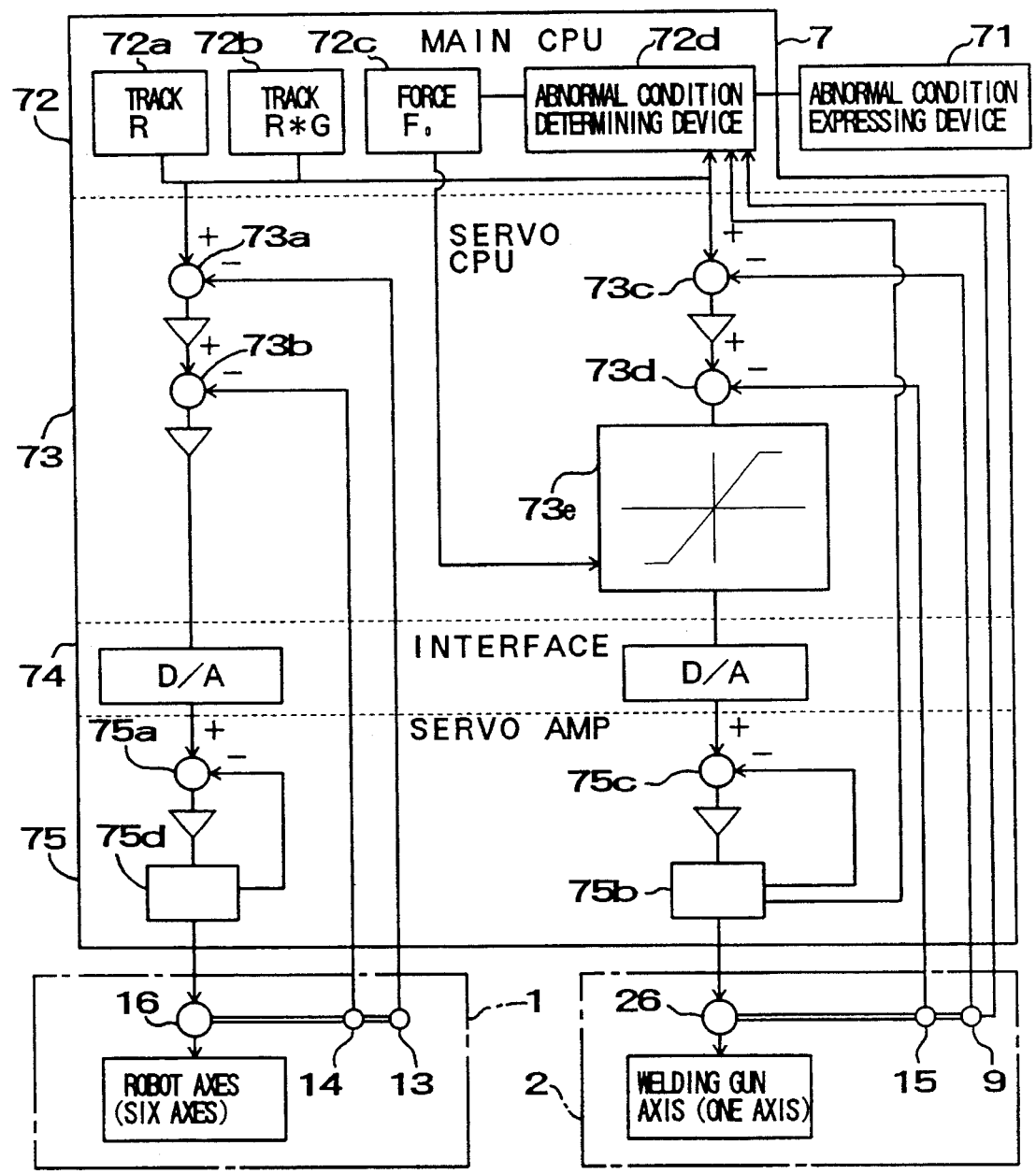
FIG. 2 is a control system diagram of a spot welding control apparatus applicable to any embodiment of the present embodiment.

As illustrated in FIG. 2, the control unit 7 includes a main CPU (central processing unit) 72, a servo CPU 73, an interface 74, a servo amplifier 75, and an abnormal condition occurrence expressing device 71. The main CPU 72 includes a first raceway track calculation portion 72a for calculating and indicating a raceway track R for the wrist portion 5 of the welding robot 1, a second raceway track calculation portion 72b for calculating and indicating a raceway track R*G for the electrode tip 3, a pressure force setting portion 72c for calculating a pressure force for the electrode tip 3, and an abnormal condition occurrence determining device 72d for determining whether or not an abnormal welding condition occurs. The abnormal condition occurrence determining device 72d has a unique structure with respect to each embodiment of the present invention. The abnormal condition occurrence determining device 72d is connected to the abnormal condition occurrence expressing device 71. When the abnormal condition occurrence determining device 72d determines that an abnormal condition occurs, the abnormal condition occurrence expressing device 71 expresses the occurrence of an abnormal condition and, if necessary, stops the welding.

The servo CPU 73 includes portions 73a and 73b for calculating differentials between (a) instruction values for a position and a speed of the robot wrist portion 5 sent from the first raceway track calculation portion 72a and (b) actual values for a position and a speed of the robot wrist portion 5 fed back from a positional sensor 13 and a speed sensor 14 coupled to each servo motor 16 of each welding robot articulation 8A to 8F, and for suitably controlling each servo motor 16 of each articulation 8A to 8F so that the above differentials become zero.

Similarly, the servo CPU 73 further includes portions 73c and 73d for calculating differentials between (a) instruction values for a position and a speed of the electrode tip 3 sent from the second raceway track calculation portion 72b and (b) actual values for a position and a speed of the electrode tip 3 fed back from the encoder 9 and the speed sensor 15 coupled to the servo motor 26, and for suitably controlling the servo motor 26 so that the above differentials become zero.

Further, the servo CPU 73 includes a portion 73e for comparing an actual pressure force value calculated from an actual electric current of the servo motor 26 with an instruction pressure force value sent from the main CPU 72, and for controlling the actual pressure force to become equal to the instruction pressure force.

The interface 74 includes a digital/analogue convertor for converting a digital signal from the servo CPU 73 to an analogue signal. The servo amplifier 75 includes a portion 75d for detecting an electric current flowing in the servo motor 16 of each articulation of the welding robot 1, and a portion 75a for controlling the electric current of the servo motor 16 based on a differential between the detected actual electric current and an instruction electric current for the servo motor 16. Further, the servo amplifier 75 includes an electric current detecting sensor 75b for detecting an electric current flowing in the servo motor 26 for moving the electrode tip 3, and a portion 75c for controlling the electric current of the servo motor 26 based on a differential between an actual electric current value fed back from the sensor 75b and an instruction value.

A signal from the electric current detecting sensor 75b and a signal from the encoder 9 as a positional sensor are fed to the abnormal condition occurrence determining device 72d of the main CPU 72. Based on these inputs, the abnormal condition occurrence determining device 72d determines whether or not an abnormal condition occurs. When the device 72d determines that an abnormal condition exists, the device 72d sends a signal to the abnormal condition occurrence expressing device 71 which in turn expresses the occurrence of the abnormal condition.

Next, structures and operation unique to each embodiment of the present invention will be explained.

With the first embodiment of the present invention, the abnormal condition occurrence determining device 72d includes an over-pressure determining device 72d(1) for determining whether or not an instant pressure force of the electrode tip 3 is too large, and is illustrated with reference to FIGS. 5 to 7.

In FIG. 5, when the pressure force of the electrode tip is controlled based only on a servo motor electric current, if some obstacle 60 happens to come between the workpiece 6 so that the electrode tip 3 comes into contact with the obstacle 60, the servo motor electric current will abnormally increase. As a result, even though the electrode tip 3 does not press the workpiece 6, the CPU will wrongly decide that the electrode tip 3 is pressing the workpiece 6.

To prevent such an error, according to the first embodiment of the present invention, both the servo motor electric current and the position of the electrode tip 3 are monitored during the pressing action. When the electric current of the servo motor 26 exceeds a predetermined threshold, the encoder value (namely, the position of the electrode tip 3) is checked. Only when the encoder value shows that the electrode tip 3 is not close to the workpiece 6, the overload determining means 72d(1) determines that an overload occurs and that some obstacle 60 happens to exist between the electrode tip 3 and the workpiece 6.

More particularly, the control routines of FIGS. 6 and 7 are installed in the main CPU 72. In the control routine of FIG. 6, at step 101, a total thickness (TH) of the workpiece (a summation of a thickness of a first panel and a thickness of a second panel) at each welding point (determined from data about the thicknesses of the first and second panels constituting the workpiece) is calculated. Based on the total thickness of the workpiece, a theoretical encoder value (EN) at which the electrode tip 3 will come into contact with the workpiece 6 is calculated. Then, at step 102, these calculated values are stored in the RAM (random access memory of control unit 7).

The control routine of FIG. 7 is cycled at small time intervals. At step 111, the data about TH and EN stored in the RAM are retrieved. At one welding point, the electrode tip 3 is moved toward the workpiece 6 by driving the servo motor 26 (step 112). At step 113, an actual electric current (AMP) of the servo motor 26 is detected by the electric current detecting sensor 75b, and an actual position of the electrode tip 3 is detected by the encoder 9. Then, at step 114, it is determined whether or not the detected actual servo motor electric current AMP exceeds a predetermined threshold AMP0 sent from the main CPU 72. The step 114 constitutes the overload determining action. When the electrode tip 3 contacts an obstacle 60 and the workpiece 6, the overload determining means determines that an overload condition exists. If it is determined at step 114 that no overload condition exists, the routine returns to step 112 and repeats the cycle.

If it is determined at step 114 that an overload condition exists, the routine proceeds to step 115, where a decision is made as to whether or not the electrode tip 3 is simply proximate to the workpiece 6 as intended. The step 115 constitutes a tip position determining device. If it is determined at step 115 that the electrode tip 3 is not close to the workpiece 6, it is deemed that the electrode tip 3 is instead contacting some obstacle 60. Then, the routine proceeds to step 116, where the abnormal condition occurrence expressing device expresses the occurrence of the abnormal condition. The steps 114 and 115 constitute an abnormal condition occurrence determining process 72d(1) of the first embodiment of the present invention.

If it is determined at step 115 that the electrode tip 3 is simply close to the workpiece 6, the routine proceeds to step 117, where the pressing force of the electrode tip 3 is controlled by controlling the electric current of the servo motor 26. During the pressing force control, a welding electric current is caused to flow between the pair of electrode tips 3 and 4, and the workpiece is spot-welded. Then, the routine proceeds to step 118, where the pressing force is released, and the spot welding finishes at the one welding point. Then, the welding robot 1 moves the welding gun 2 to the next welding point and spot welding is conducted in the same manner. When it is confirmed at step 119 that spot weldings at all welding points are finished, the routine shown in FIG. 7 ends.

Figure 8:
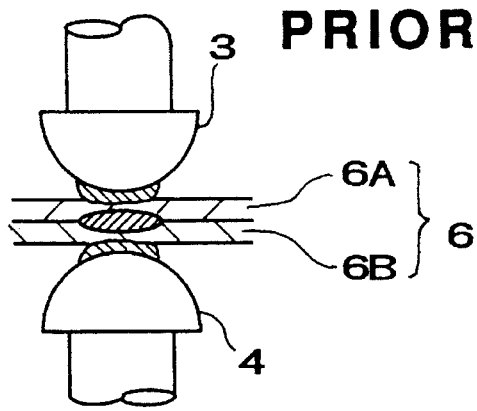
FIG. 8 is a cross-sectional view of an electrode tip adhered to a workpiece, a problem which is to be solved in a second embodiment of the present invention.

With the second embodiment of the present invention, the abnormal condition occurrence determining device 72d includes a temperature adhesion determining device or means 72d(2) for determining whether or not temperature adhesion between the electrode tip 3 and the workpiece 6 exists, and is illustrated in FIGS. 8 to 13. FIG. 8 shows a pair of electrode tips 3 and 4 adhered to the workpiece 6.

In the prior art, temperature adhesion of the electrode tips to the workpiece is visually determined. However, automatic detection for temperature adhesion is desirable. In the second embodiment of the present invention, after spot welding, a differential between an instruction position $P_{CMD}$ for the servo motor 26 and an actual position $P_E$, and an actual electric current iM of the servo motor 26 are monitored. When the above differential ($P_E - P_{CMD}$) exceeds a first threshold $P_{THR}$ and the servo motor electric current iM exceeds a second threshold $iM_{THR}$, it is determined that temperature adhesion of the electrode tips 3 and 4 with the workpiece 6 has occurred. An abnormal condition occurrence is then indicated. In this instance, it is possible to detect the temperature adhesion by only comparing the actual position $P_E$ with the instructed position $P_{CMD}$, without necessarily checking the electric current iM.

Figure 9:
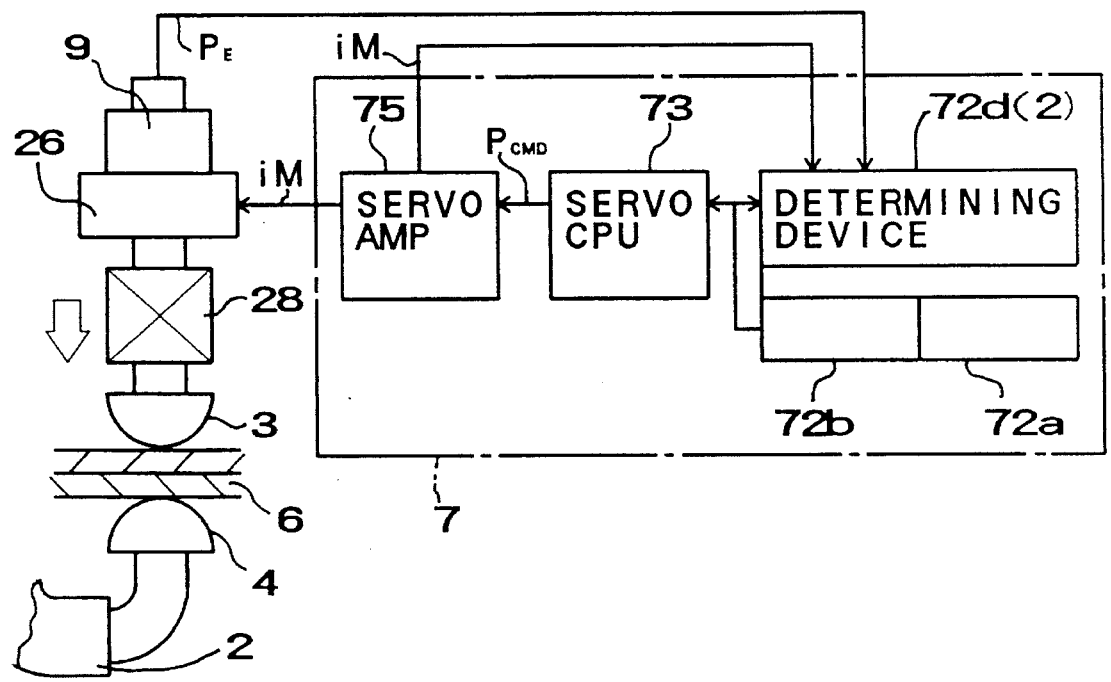
FIG. 9 is a schematic control system diagram in accordance with the second embodiment of the present invention.

More particularly, as illustrated in FIG. 9, a temperature adhesion determining device 72d(2) and an abnormal condition occurrence determining device 72d are installed in the main CPU 72. A signal $P_E$ from the encoder 9 coupled to the servo motor 26, and a signal iM from the electric current detecting sensor 75b connected to the servo motor 75, are fed back to the temperature adhesion determining device 72d(2). Further, the instruction position $P_{CMD}$ of the electrode tip sent from the raceway track calculating portions 72a and 72b of the main CPU 72 is also fed to the temperature adhesion determining device 72d(2).

Figure 10:
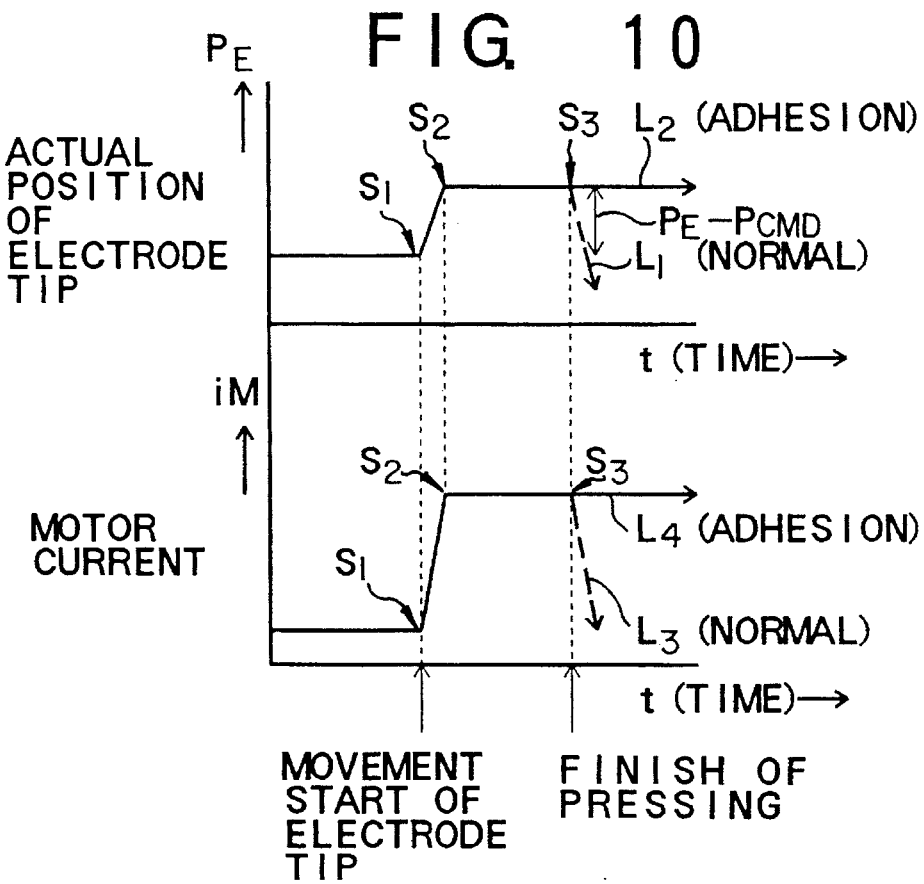
FIG. 10 is a graphical representation illustrating changes in an electrode tip position and a servo motor electric current with respect to time elapsed.
Figure 11:
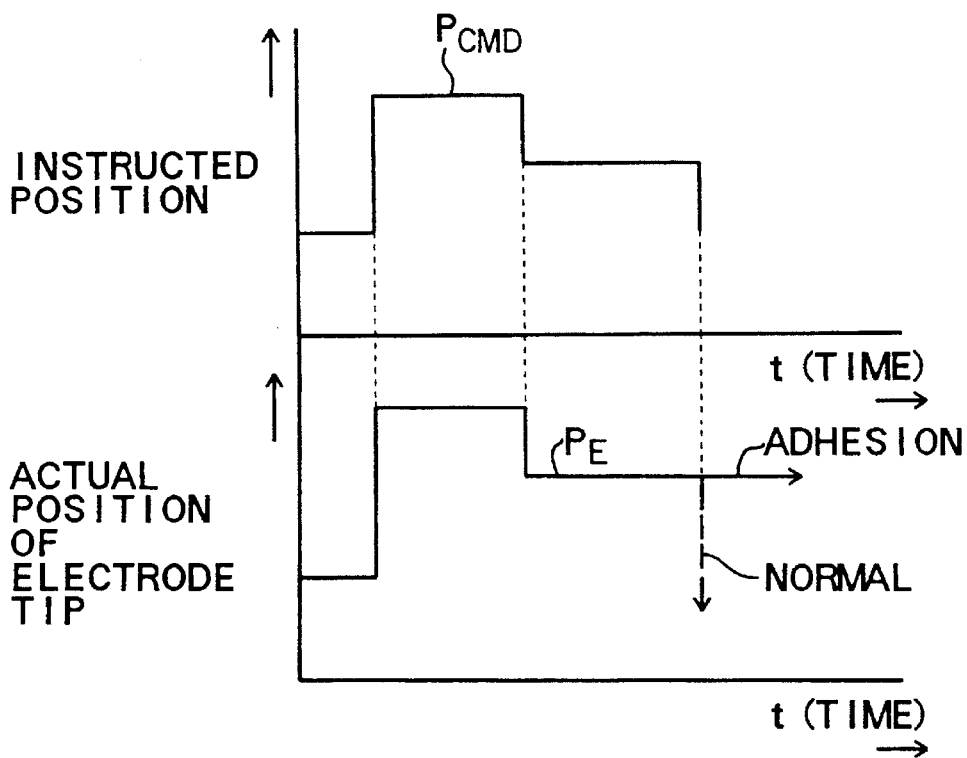
FIG. 11 is a diagram comparing an instructed position and an actual position of an electrode tip.

FIG. 10 illustrates corresponding changes in the actual position $P_E$ of the electrode tip 3 and the actual electric current iM of the servo motor 26 in a case when temperature adhesion occurs. At point $S_1$, the electrode tip 3 begins to move toward the workpiece 6, and comes into contact with the workpiece 6 at point $S_2$. Then, between points $S_2$ and $S_3$, a welding current flows between the pair of electrode tips 3 and 4 so that the workpiece is spot-welded. The electrode tip 3 begins to move away from the workpiece 6 at point $S_3$. In a normal condition where no temperature adhesion occurs, as illustrated by dotted line $L_1$ (instructed position $P_{CMD}$), the electrode tip 3 can move away from the workpiece 6. However, in an abnormal condition where temperature adhesion occurs, as illustrated by full line $L_2$, the electrode tip 3 cannot move away from the workpiece 6. The distance between $L_1$ and $L_2$ shows a differential between $P_E$ and $P_{CMD}$. Further, in a case where no temperature adhesion has not occurred, the actual electric current of the servo motor 26 decreases, as shown by dotted line $L_3$, when the electrode tip 3 moves away from the workpiece 6 after spot welding. In contrast, in a case where temperature adhesion has occurred, the electric current of the servo motor 26 remains constant as shown by full line $L_4$. Therefore, by watching the differential between $P_E$ and $P_{CMD}$ and/or the electric current iM, a temperature adhesion can be detected. FIG. 11 illustrates that a temperature adhesion can be detected by the differential between $P_E$ and $P_{CMD}$ only.

FIG. 12 illustrates a control routine for automatically detecting a temperature adhesion. This control routine is cycled at small time intervals. At step 201, an instruction position $P_{CMD}$ of the electrode tip 3 sent from the second calculating portion 72b, an actual position $P_E$ from the encoder 9, and an actual servo motor electric current iM from the electric current detecting sensor 75b are retrieved. Then, at step 202, it is determined whether a differential between $P_E$ and $P_{CMD}$ exceeds a first threshold $P_{THR}$ and/or whether the actual electric current iM exceeds a second threshold $iM_{THR}$. The step 202 combines a positional differential determining device and an electric current determining device as an abnormal condition occurrence determining device. The abnormal condition occurrence determining device may be constructed of a positional differential determining device only. When the positional differential exceeds the first threshold and/or the electric current exceeds the second threshold, it is determined that temperature adhesion has occurred, and the routine proceeds to step 203 where the abnormal condition occurrence expressing device indicates that temperature adhesion has occurred. If either one of the positional differential and the electric current does not exceed the corresponding threshold, the routine proceeds to step 204, where it is determined whether or not the pressure release has been finished. If the pressure release has not been finished, the routine goes back to step 201 and the cycle is repeated. In contrast, when the pressure release has been finished at step 204, the cycle ends.

As illustrated in FIG. 13, steps 205 and 206 for separating the electrode tips from the workpiece may be provided between steps 203 and 204. After the abnormal condition occurrence expressing device indicates the existence of an abnormal condition, the routine proceeds to step 205, where the electric current iM of the servo motor 26 is incrementally increased by delta iM so that the separating force is increased. If the adhering electrode tips become separated from the workpiece, the electric current of the servo motor will decrease. So, at step 206, it is decided whether the electric current iM is now lower than the second threshold $iM_{THR}$. If iM is not yet lower than $iM_{THR}$, the routine goes back to step 205 so that the electric current iM is further increased. If iM is lower than $i_{MTHR}$, it is presumed that the electrode tips 3 and 4 have been successfully separated from the workpiece 6, and the routine proceeds to step 204 so that the same cycle as discussed in FIG. 12 is conducted. In this way, even if temperature adhesion occurs, the separating force is automatically increased so that the electrode tips are smoothly separated from the workpiece.

With the third embodiment of the present invention, the abnormal condition occurrence determining device 72d includes an uneven pressure determining means for detecting uneven pressure on the workpiece by one of the electrode tips 3 and 4 so that such uneven pressure is prevented, and is illustrated in FIGS. 14 to 17.

In the conventional welding gun, only one of the electrode tips is driven toward and away from the workpiece. As a result, if the driven electrode tip is not moved by a welding robot to a correct position relative to the workpiece and/or changes in configuration due to abrasion, uneven pressure occurs, which can deform the workpiece. To prevent uneven pressure, an equalizing mechanism is provided in the conventional welding gun, which is accompanied by an undesirable increase in the size of the welding gun.

Figure 14:
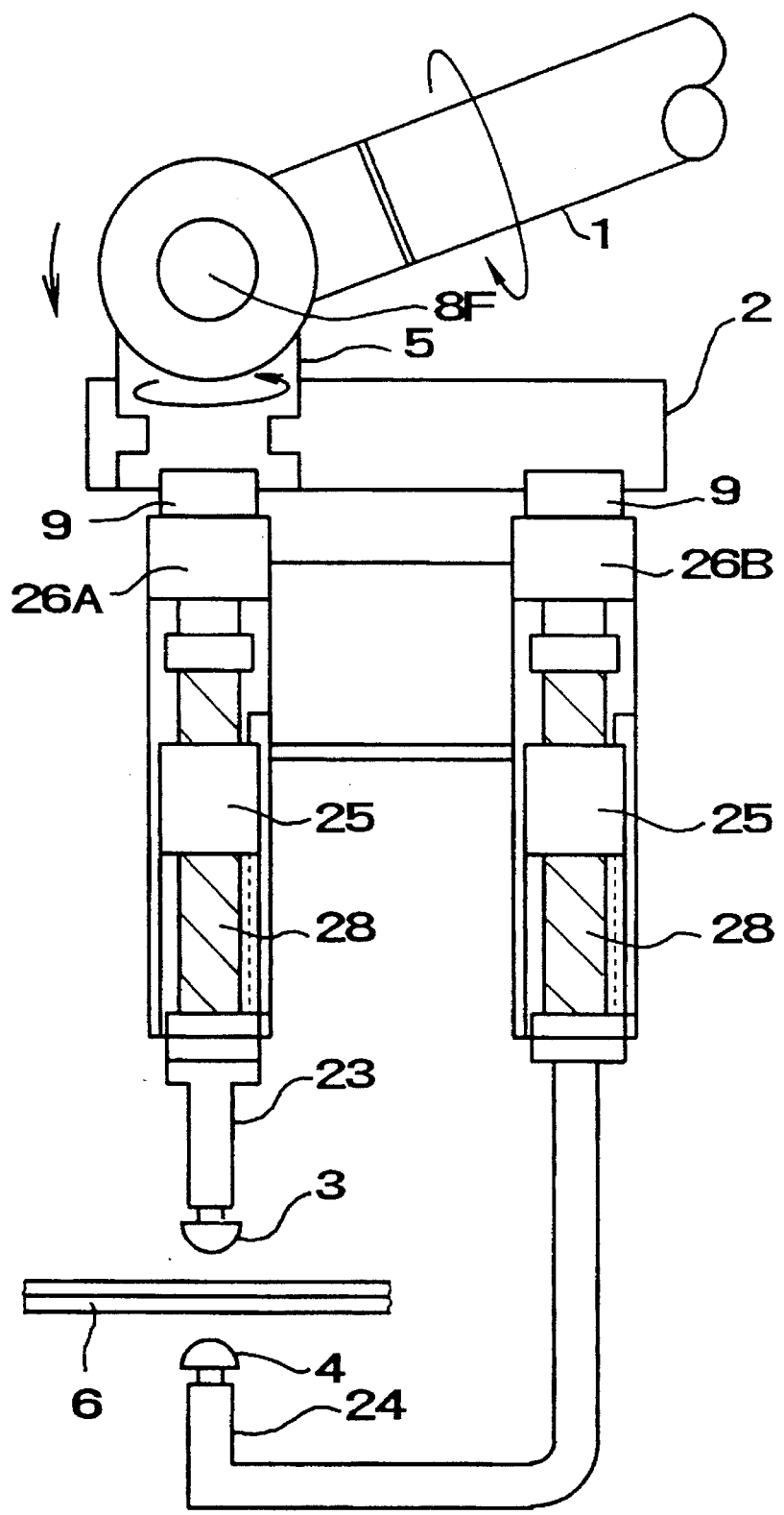
FIG. 14 is an elevational view of a double actuator type welding gun in accordance with a third embodiment of the present invention.

In contrast, as illustrated in FIG. 14, the welding gun 2 coupled to the wrist portion 5 of the welding robot 1 is a double actuator welding gun having two actuators (servo motors 26A and 26B). Each of the electrode tips 3 and 4 is driven via a respective threaded rod 28 and a respective nut 25 by a respective servo motor 26A, 26B, independently of each other. The pair of servo motors 26A and 26B are disposed generally parallel to each other so that the welding gun is advantageously compact. One of the pair of servo motors 26A and 26B has an axis extending through both the axes of electrode tips 3 and 4 and the center of the articulation 8F of the welding robot 1. As a result, the reaction force of the electrode tips 3 and 4 passes through the center of the articulation 8F and will not cause any moment on the articulation 8F so that a deformation of the robot will be minimized.

Figure 15:
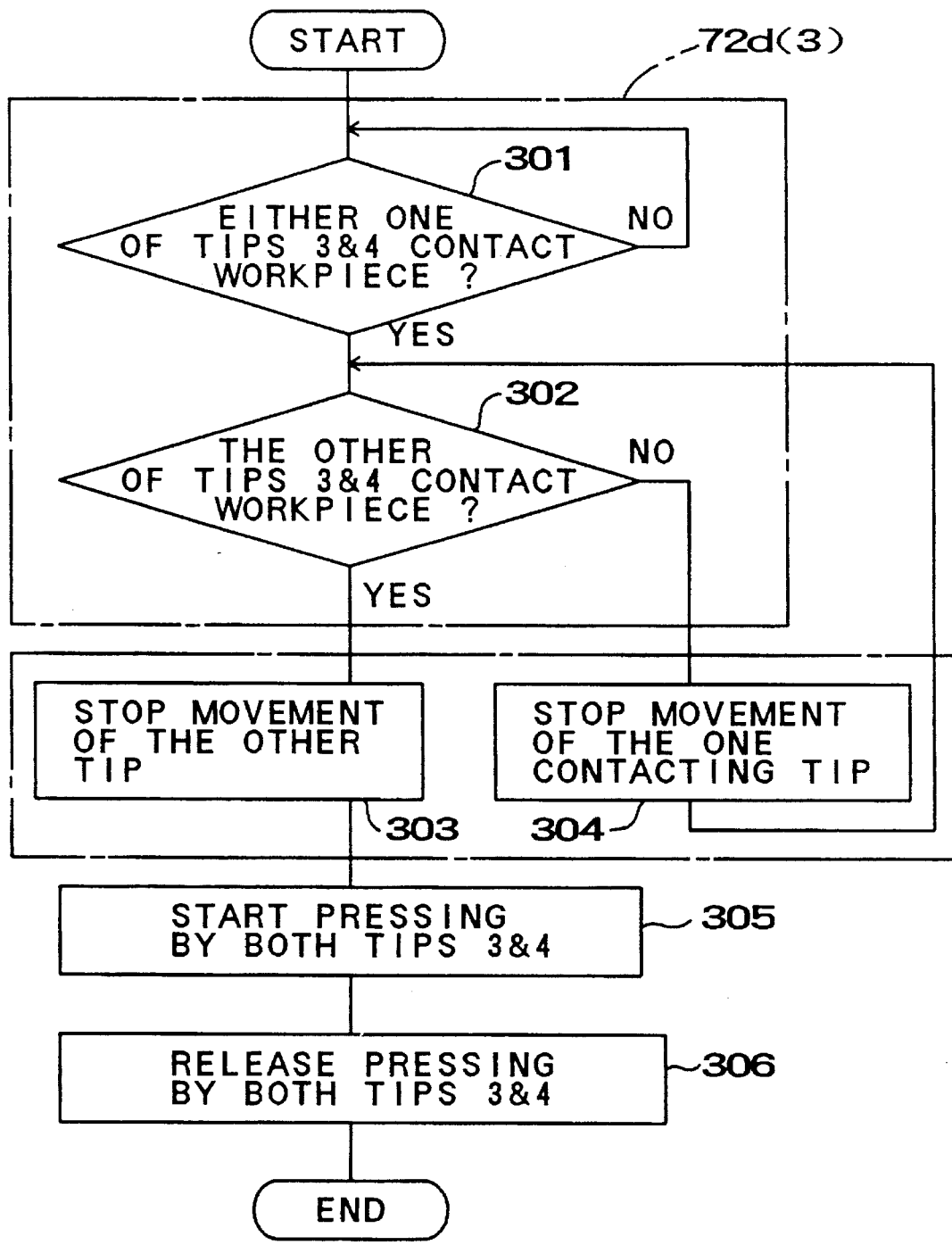
FIG. 15 is a flow chart of a control routine in accordance with the third embodiment of the present invention.

FIG. 15 illustrates a control routine for detecting uneven pressure on the workpiece 6 by the electrode tips 3 and 4, and for preventing such uneven pressure. This routine is cycled at small time intervals. At step 301, it is decided whether either one of the electrode tips 3 and 4 is in contact with the workpiece 6. If neither tip is not yet is in contact with the workpiece, the cycle is repeated until at least one of the tips comes into contact with the workpiece. When at least one of the tips is in contact with the workpiece, the routine proceeds to step 302. In this connection, the contact of the tip with the workpiece can be determined by a sudden increase in the electric current of the servo motor 26A, 26B as illustrated in FIG. 16, or by a change in position of the tips 3 and 4 from a varying state to a constant state as illustrated in FIG. 17. At step 302, it is determined whether or not the other electrode tip also is in contact with the workpiece 6. Step 302 is repeated until the other electrode tip comes in contact with the workpiece 6. In steps 301 and 302, if only one of the electrode tips 3 and 4 come in contact with the workpiece 6, the driving of that electrode tip by the corresponding actuator is stopped. In steps 301 and 302, if both of the electrode tips 3 and 4 come into contact with the workpiece 6, the routine proceeds to step 303 so that driving of the other electrode tip by the corresponding actuator is also stopped. The steps 301 and 302 constitute an uneven contact determining device for determining whether or not uneven contact of the electrode tips 3 and 4 occurs, and constitutes an abnormal condition occurrence determining device 72d(3) of the third embodiment of the present invention. The steps 303 and 304 constitute an uneven contact preventing device for stopping motion of one of the electrode tips when only one electrode tip comes into contact with the workpiece.

When it is confirmed at step 304 that both electrode tips 3 and 4 have been stopped, the routine proceeds to step 305 where both tips 3 and 4 are driven to evenly press the workpiece 6 from both sides. After the welding, the pressurizing is released at step 306 and then the cycle ends.

By the above control process, no equalizing-mechanism needs to be provided. As a result, piping for an equalizing mechanism needs to be disposed around the robot and the weight of the welding gun itself is decreased. In above, the servo motor may be replaced by a linear motor.

With the fourth embodiment of the present invention, fused metal dispersion from a weld nugget is detected and prevented during an abnormal condition occurrence determining step as illustrated in FIGS. 18 to 20.

As illustrated in FIG. 18, while the workpiece including panels 6A and 6B is pressed and spot-welded by flowing an electric current between electrode tips 3 and 4, a fused metal dispersion may occur if the pressing force of the electrode tips 3 and 4 is small, if a gap exists between the panels 6A and 6B, or if a gap exists between the workpiece 6 and at least one of the electrode tips 3 and 4. Such dispersion decreases welding strength and should be prevented.

FIG. 19 illustrates a change in the pressing force of the electrode tips 3 and 4 when a fused dispersion occurs. In FIG. 19, line $F_0$ indicates an instructed pressing force value from the main CPU 72. As seen from FIG. 19, when a dispersion occurs, an actual pressing force of the electrode tips 3 and 4 suddenly decreases, and the actual pressing force F also changes at the same time. Therefore, by detecting the actual electric current of the servo motor 26 at small time intervals, occurrence of a fused metal dispersion can be determined. To prevent such a dispersion from repeatedly occurring, it is effective to increase the magnitude of the electric current of the servo motor 26 to thereby increase the pressing force of the electrode tips 3 and 4, preferably to a force greater than the pressing force at the time of occurrence of the first dispersion. To increase the pressing force, as illustrated in FIG. 19, the instructed servo motor electric current value from the main CPU 72 is increased in a short time period so that the actual servo motor electric current is increased.

FIG. 20 illustrates a control routine for conducting the above-described control, which is installed in the main CPU 72 of FIG. 2. The control routine is cycled at small time intervals. At step 401, it is determined whether or not welding is currently being conducted. When it is determined that welding is being conducted, the routine proceeds to step 402, where the instant actual electric current $iM_k$ of the servo motor 26 from the electric current detecting sensor 75b is entered. In this connection, reference k is a number of the instant cycle, and (k–1) is a number of the previous cycle. Then, at step 403, it is determined whether or not the electric current $iM_k$ of the instant cycle is lower than the electric current $iM_{k-1}$ of the previous cycle by at least a predetermined differential delta i. If $iM_k$ is lower than $iM_{k-1}$ by more than delta i, it is presumed that a decrease in the pressing force due to dispersion has occurred, and the routine proceeds to step 404. If no decrease is seen in $iM_k$, it is presumed that no dispersion has occurred, and the cycle ends. The step 403 is a dispersion occurrence determining device and constructs an abnormal condition occurrence determining device or means 72d(4) of the fourth embodiment of the present invention. Then, at step 404, either the instructed servo motor electric current $iM_{COM}$ from the main CPU 72 is increased to a larger value $iM_{COM}'$, or the welding current flowing between the electrode tips 3 and 4 is decreased. As a result, the actual servo motor current automatically increases, and the actual pressing force of the electrode tips 3 and 4 increases, so that dispersion is prevented. The step 404 is programmed in a dispersion preventing device.

With the fifth embodiment of the present invention, a gap between panels of the workpiece which tends to cause a welding fused metal dispersion is detected, and is removed from between the panels during an abnormal condition occurrence determining step as illustrated in FIGS. 21 and 22.

At step 501, contact between the electrode tip 3 and the workpiece 6 is detected. The contact can be detected by determining that the output of the encoder 9 becomes constant or by determining that the electric current of the servo motor 25 incrementally changes. Then, at step 502, the total thickness of the workpiece 6 is calculated based on the position of the electrode tip 3. At step 503, a gap S which may exist between panels 6A and 6B (see FIG. 18) of the workpiece 6 is presumed or calculated as a differential between the total thickness of the workpiece and a summation of the panel thicknesses. At step 504, it is determined whether or not the presumed gap S is smaller than a predetermined allowable gap $S_0$. If S is smaller than $S_0$, it is presumed that no dispersion will occur, and the routine proceeds to step 505. If S is equal to or greater than $S_0$, it is presumed that dispersion may occur, and the routine proceeds to step 506. The steps 503 and 504 are a large gap existence determining device which constructs an abnormal condition occurrence determining device 72d(5) of the fifth embodiment of the present invention. At step 505, a pre-pressing time period is controlled to be short, while at step 506, a pre-pressing time period is controlled to be long. By controlling the pre-pressing time period to be long, a gap which may exist between the panels 6A and 6B is decreased or removed. Then, at step 507, spot welding is conducted by flowing a welding current between the electrode tips 3 and 4 through the workpiece 6. The cycle then ends. A relationship between pre-pressing and spot welding is shown in FIG. 22.

With the sixth embodiment of the present invention, an electric resistance between the electrode tips and the workpiece which tends to cause a fused metal welding dispersion is detected and decreased during an abnormal condition occurrence determining step, as illustrated in FIGS. 23 and 24.

if the electrical resistance between the electrode tips 3 and 4 and the workpiece 6 is large due to adhesion of dusts and due to a gap which may exist between the electrode tips and the workpiece, a fused metal dispersion at a welding nugget will tend to occur.

To decrease the electrical resistance between the electrode tips and the workpiece, in the sixth embodiment of the present invention, the electrode tips 3 and 4 are forcibly rotated by an angle of 2 to 3 degrees about the common axis thereof for a short time period upon contact of the electrode tips 3 and 4 with the workpiece 6. The electrode tips 3 and 4 are rotated by driving the welding robot 1, and more particularly, by driving each servo motor 16 of each articulation 8A, ..., 8F of the welding robot 1. Pushing the electrode tips 3 and 4 against the workpiece 6 while rotating the electrodes causes the electrode tips 3 and 4 to contact the workpiece more closely so that the electric resistance between the electrode tips and the workpiece is decreased.

FIG. 24 illustrates rotation of the electrode tips 3 and 4 about the common axis thereof. FIG. 23 illustrates a subroutine for controlling rotation of the electrode tips 3 and 4. The subroutine is entered at step 117 of the control routine of FIG. 7, and when the subroutine ends, the routine returns to step 118 of FIG. 7.

In the control routine of FIG. 23, when the routine comes to step 601, it has been confirmed at steps 114 and 115 of FIG. 7 that the electrode tips 3 and 4 are touching the workpiece 6. At step 601, the actuators of the robot articulations 8A to 8F are controlled to cause the electrode tips 3 and 4 to rotate about the common axis thereof by about 2 to 3 degrees. Then, at step 602, the servo motor 26 is controlled to control the pressing force of the electrode tips 3 and 4. Spot welding is then conducted by flowing an electric current between the electrode tips 3 and 4. Then, the routine returns to step 118 of FIG. 7. Due to the control by step 601, the electric resistance is decreased and occurrence of a weld nugget dispersion is prevented.

Although several embodiments of the present invention have been described in detail above, it will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the invention as defined by the following claims.

What is claimed is:

1. A spot welding control method for controlling a welding gun having a pair of welding electrode tips, at least one of the tips being driven by a respective servo motor, the method comprising the steps of:

moving the at least one electrode tip relative to a workpiece by driving the servo motor coupled thereto based on an instruction from a main CPU;

detecting both an actual position of the at least one electrode tip and an actual electric current of the servo motor; and determining, based on the detected values of the actual position of the at least one electrode tip and the actual current, whether an abnormal welding condition exists.

2. A method according to claim 1, further including a step of indicating an abnormal condition occurrence when it is determined during said determining step that an abnormal condition exists.

3. A method according to claim 1, wherein:

during said electrode tip moving step, the at least one electrode tip is moved toward the workpiece;

during said detecting step, both an actual position of the at least one electrode tip and a corresponding actual electric current of the servo motor are detected; and during said abnormal condition occurrence determining step, when the actual motor electric current is determined to be larger than a reference electric current and when it is determined that the at least one electrode tip is not proximate to the workpiece, it is concluded that an obstacle is interposed between the electrode tip and the workpiece and it is decided that an abnormal condition exits.

4. A method according to claim 3, further comprising a step of causing the electrode tips to rotate by a predetermined angle about a common axis of the pair of electrode tips when it is determined during said abnormal condition occurrence determining step that no abnormal condition exists and when at least one electrode tip comes into contact with the workpiece.

5. A method according to claim 4, wherein said predetermined angle is about 2 to 3 degrees.

6. A method according to claim 1, wherein during said electrode tip moving step, the servo motor is biased in rotation in a direction to bias the at least one electrode tip in a direction away from the workpiece;

during said detecting step, an instantaneous actual electrode tip position and an actual servo motor electric current are detected; and during said abnormal condition occurrence determining step, it is determined whether a positional differential between the instantaneous actual electrode tip position and a reference electrode tip position exceeds a first threshold and whether the actual servo motor electric current exceeds a second threshold, wherein when the positional differential exceeds the first threshold and when the actual servo motor electric current exceeds the second threshold, it is concluded that temperature adhesion between the at least one electrode tip and the workpiece exists.

7. A method according to claim 6, further comprising a step of incrementally increasing an actual servo motor electric current to separate the adhered electrode tip away from the workpiece.

8. A method according to claim 1 wherein the welding gun is a double actuator gun having a pair of electrode tips, each driven by respective servo motors, and wherein:

during said electrode tip moving step, the pair of electrode tips are moved toward the workpiece;

during said detecting step, positions of the pair of electrode tips and corresponding electric currents of the servo motors are detected at small time intervals; and during said abnormal condition occurrence determining step, it is determined whether the pair of electrode tips come into contact with the workpiece at different times.

9. A method according to claim 8, further comprising steps of:

after determining that a non-simultaneous contact of the electrode tips with the workpiece occurs, independently stopping a motion of each electrode tip when said each electrode tip comes into contact with the workpiece; and after confirming that both electrode tips have stopped, causing both electrode tips to uniformly press the workpiece.

10. A method according to claim 1, wherein:

during said electrode tip moving step, the at least one electrode tip is brought into contact with the workpiece and is biased to press the workpiece;

during said detecting step, an actual servo motor electric current is repeatedly detected at a plurality of time intervals; and during said abnormal condition occurrence determining step, it is determined whether an actual servo motor electric current value at a given time interval has decreased by a predetermined current value compared with a servo motor electric current value at a preceding time interval, and when the actual servo motor electric current value has decreased, a conclusion is made that an abnormal condition of a weld nugget dispersion exists.

11. A method according to claim 10, further comprising a step of increasing an instruction servo motor electric current value to a predetermined value when it is determined during said abnormal condition occurrence determining step that an abnormal condition of a weld nugget exists.

12. A method according to claim 10, further comprising a step of decreasing a welding current flowing between the electrode tips to a predetermined value when it is determined during said abnormal condition occurrence determining step that an abnormal condition of a weld nugget exists.

13. A method according to claim 1, wherein during said electrode tip moving step, said at least one electrode tip is moved toward the workpiece to be brought into contact with the workpiece;

during said detecting step, a total thickness of the workpiece including two panels is detected; and during said abnormal condition occurrence determining step, a magnitude of a gap existing between the two panels of the workpiece is presumed, wherein if the presumed gap is larger than the predetermined value, it is determined that a weld nugget dispersion may occur.

14. A method according to claim 13, further comprising a step of increasing a pre-pressing time period when it is determined during said abnormal condition occurrence determining step that a weld nugget dispersion may occur.

15. A spot welding control apparatus using a servo welding gun comprising:

a welding gun including a pair of electrode tips, at least one of the electrode tips being driven by a servo motor;

an encoder coupled to said servo motor to detect an actual position of said at least one electrode tip;

an electric current detecting sensor electrically connected to said servo motor for detecting an actual electric current of said servo motor; and an abnormal condition occurrence determining means for determining, based on values detected by both the encoder and the electric current detecting sensor, whether an abnormal welding condition exists.

16. An apparatus according to claim 15, further including abnormal condition indicating means for detectably indicating an abnormal condition occurrence when said abnormal condition occurrence determining means determines that an abnormal condition exists.

17. An apparatus according to claim 15, wherein said abnormal condition occurrence determining means includes:

(a) an overload determining means for determining whether an actual motor electric current exceeds a reference electric current; and (b) an electrode tip position determining means for determining whether the at least one electrode tip is proximate to the workpiece, wherein when said overload determining means determines that the actual motor electric current exceeds the reference electric current and said electrode tip position determining means determines that the at least one electrode tip is not proximate to the workpiece, said abnormal condition occurrence determining means concludes that an abnormal condition exists.

18. An apparatus according to claim 15, wherein said abnormal condition occurrence determining means includes a positional differential determining means for determining whether a differential between an actual electrode tip position and a reference electrode tip position exceeds a first threshold and electric current determining means for determining whether an actual servo motor electric current exceeds a second threshold, such that when the positional differential exceeds the first threshold and the actual servo motor electric current exceeds the second threshold, a conclusion is made that temperature adhesion between the at least one electrode tip and the workpiece exists.

19. An apparatus according to claim 18, further comprising electric current increasing means for incrementally increasing an actual servo motor electric current to forcibly separate the adhered electrode tip away from the workpiece.

20. An apparatus according to claim 15 wherein the welding gun is a double actuator gun, wherein the pair of electrode tips are driven by respective servo motors, wherein an encoder is provided to each of said servo motors, said electric current detecting sensor being provided to each of the servo motors, wherein said abnormal condition occurrence determining means includes non-simultaneous contact occurrence determining means for determining whether one of said electrode tips contacts the workpiece and the other said electrode tip does not contact the workpiece.

21. An apparatus according to claim 20, further comprising:

first stopping means for stopping a motion of one of said electrode tips when the one said electrode tip contacts with the workpiece;

second stopping means for stopping a motion of the other of the electrode tips when the other electrode tip comes into contact with the workpiece; and pressure starting means for allowing both electrode tips to uniformly press the workpiece after confirming that both electrode tips have been stopped.

22. An apparatus according to claim 20, wherein said servo motors are parallel with each other, an axis of one of said servo motors passing through respective axes of said electrode tips.

* * * * *